(12) United States Patent
Hesani

(10) Patent No.: US 9,568,397 B2
(45) Date of Patent: Feb. 14, 2017

(54) INSTANT CRANKSHAFT DEVICE FOR PISTON ENGINES AND BEARING SHAFTS

(71) Applicant: Abbas Hesani, Karaj (IR)

(72) Inventor: Abbas Hesani, Karaj (IR)

(*) Notice: Subject to any disclaimer, the term of this patent is extended or adjusted under 35 U.S.C. 154(b) by 0 days.

(21) Appl. No.: 13/958,586

(22) Filed: Aug. 4, 2013

(65) Prior Publication Data

US 2016/0282233 A1    Sep. 29, 2016

(51) Int. Cl.
*G01M 15/02* (2006.01)
*G01M 99/00* (2011.01)
*F02B 77/08* (2006.01)

(52) U.S. Cl.
CPC ............ *G01M 99/008* (2013.01); *F02B 77/08* (2013.01)

(58) Field of Classification Search
CPC .................................................. G01M 15/02
USPC ............................... 73/114.77, 114.81
See application file for complete search history.

(56) References Cited

U.S. PATENT DOCUMENTS

| | | | | |
|---|---|---|---|---|
| 4,730,484 A * | 3/1988 | Olschefski | ............. | G01H 1/003 73/114.81 |
| 5,469,741 A * | 11/1995 | Scourtes | ................. | G01M 1/22 73/114.77 |
| 6,684,687 B1 * | 2/2004 | Frojdh | ................. | F02D 41/009 73/114.26 |
| 2007/0256482 A1 * | 11/2007 | Sheikh | ................. | G01M 15/06 73/114.26 |
| 2009/0056429 A1 * | 3/2009 | Avallone | ................. | B60K 6/48 73/114.26 |
| 2016/0178480 A1 * | 6/2016 | Turner | ................. | F02D 41/009 73/114.26 |

* cited by examiner

*Primary Examiner* — Eric S McCall
(74) *Attorney, Agent, or Firm* — Azadeh Saidi

(57) ABSTRACT

A device and method to inspect the sensitive distances of crankshaft or any other rotating axel with electrical measuring method and controlling the sensitivity and critical points according to desired explained spans. Its electronic system is flexible and has the possibility to coordinate with various control systems.

16 Claims, 15 Drawing Sheets

INSTANT CRANKSHAFT DEVICE FOR PISTON ENGINES AND BEARING SHAFTS

BACKGROUND OF THE INVENTION

One of the most important parts of a car is a crankshaft, which can be considered like the heart of a body. Unfortunately this part is usually damaged due to some physical contacts between engine and bearings which needs to be replaced by spending a lot of money.

In precise and sensitive present engines there is no method for anticipating the defects of the engine. If this is possible to perform on time, we can prevent basic breakdowns incidence in engines that sometimes result in its complete destruction.

The expenditures of basic repair of an engine are so high that can be compared with a percentage of a new engine. Crankshaft is one of the most expensive parts of engine the repair of which has high expenditures. Anticipating engines defect with the method of electronic measurement with high accuracy is the same as ECG for the engine that will show and warn weaknesses and breakdown of engine in order to prevent cost and time consuming repair.

There are many cases for eliminating crankshaft which we have to lathe, repair and finally replace this part. Considering the high price of this part we can do a basic action to increase crankshaft lifetime by this design.

Usually the beating and rough noise of engine is heard when a basic defect has happened in it and it is late to save the engine. In the case of airplane piston engines and turbines it may threaten human lives too. Since basic repair of engines particularly large engines is a hard, cost and time consuming task and needs high proficiency, by this invention, we can either prevent a small problem turning into a big defect or prevent a small defect turning into a basic problem.

SUMMARY OF THE INVENTION

Major defects of the engine start from one of the following reasons:
1. Presence of tine metal particles between crankshaft and its beds (ball bearings) that is considered as weak point of engine.
2. Reduction of engine's oil viscosity lower than permitted level
3. Driving with top gears and in lower engine cycles Reason 1: In this method the moment of metal particle entrance between ball bearing and crankshaft is detected and located through electric measurement and necessary warning is given.

Reason 2: Deteriorated oil loses its viscosity and cannot maintain the hundredths distance between crankshaft and its bed any more therefore there is a contact between crankshaft and its ball bearing. This contact is enough for activating electronic alarm to inform the driver from danger start.

Reason 3: While driving with high gears when engine's cycle is not enough, beating state will appear in the engine. This beat will be transferred to bearings through crankshaft and will cause their irreparable damage. This invention will warn driver's failure to him.

BRIEF DESCRIPTION OF THE DRAWINGS

FIG. 2: Displays C1 surface, where fixed bearings of crankshaft 10 are placed on.
FIG. 3: Displays C2 surfaces where the moving bearings of crankshaft 10 are located on.

DESCRIPTION

Figure 1:
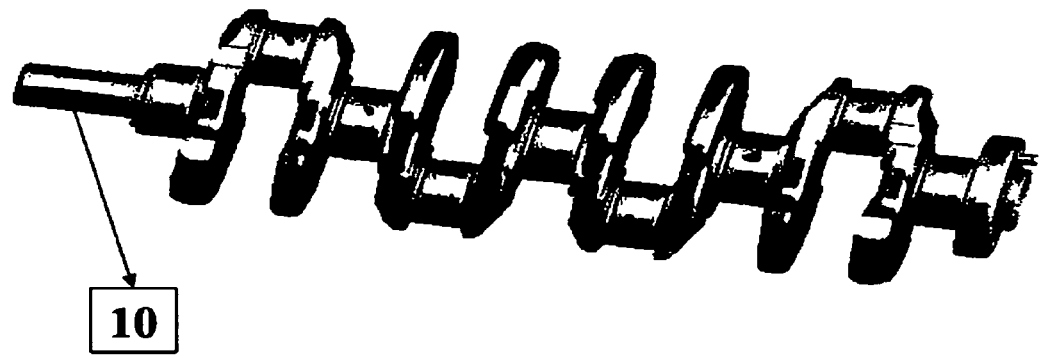
FIG. 1: Displays a 3D view of crankshaft 10
Figure 2:
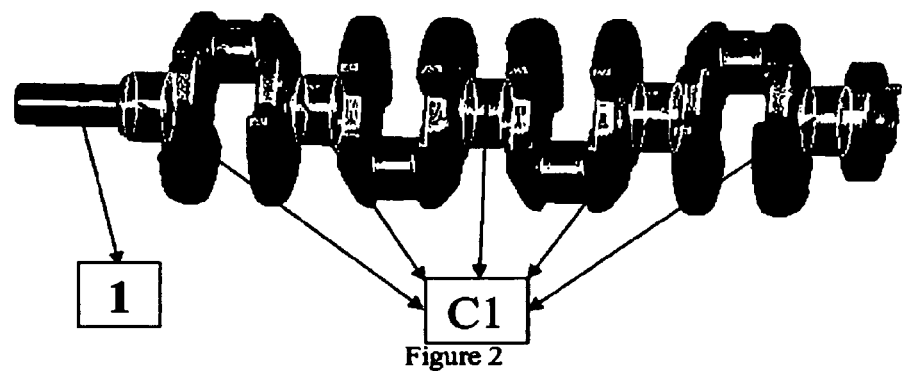
Figure 3:
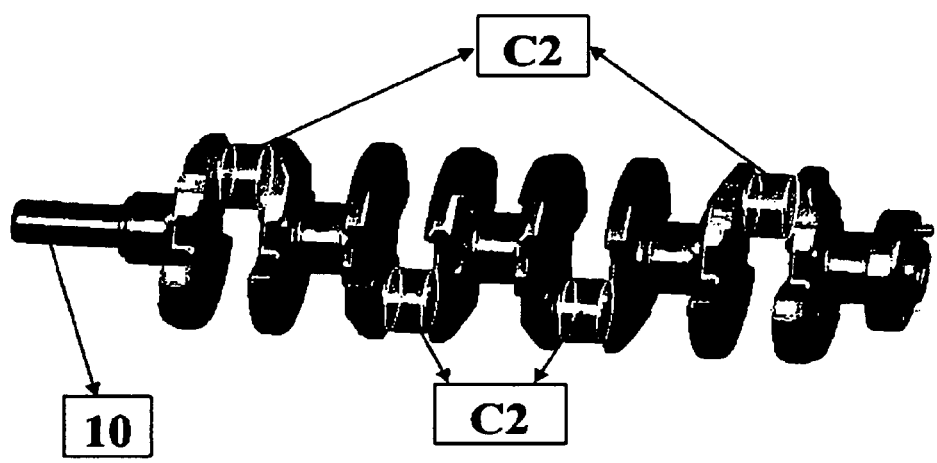
Figure 4:
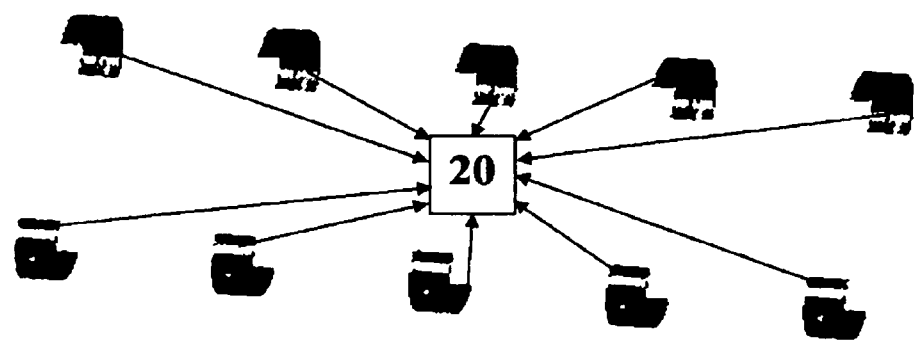
FIG. 4: Displays fixed bearings 20
Figure 5:
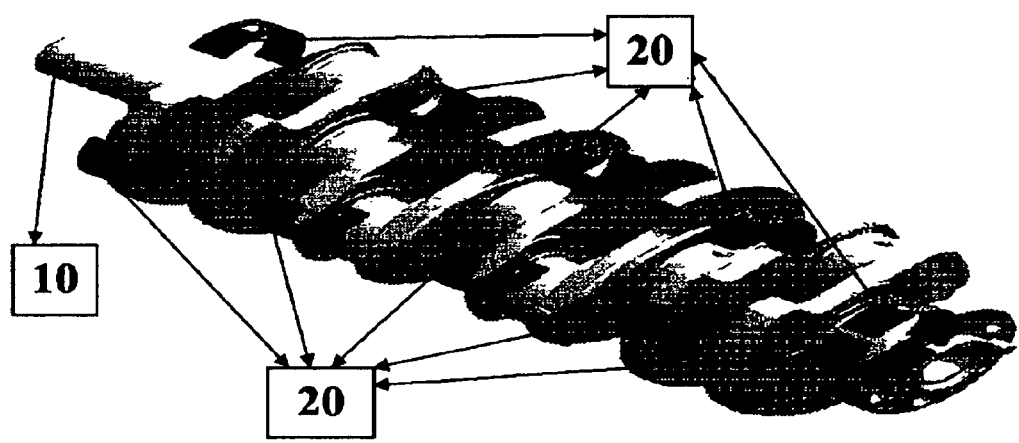
FIG. 5: Displays the arrangement of fixed bearings 20 positioned on C1 surfaces
Figure 6:
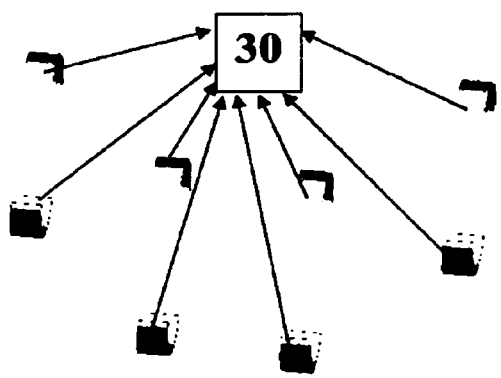
FIG. 6: Displays the moving bearings 30
Figure 7:
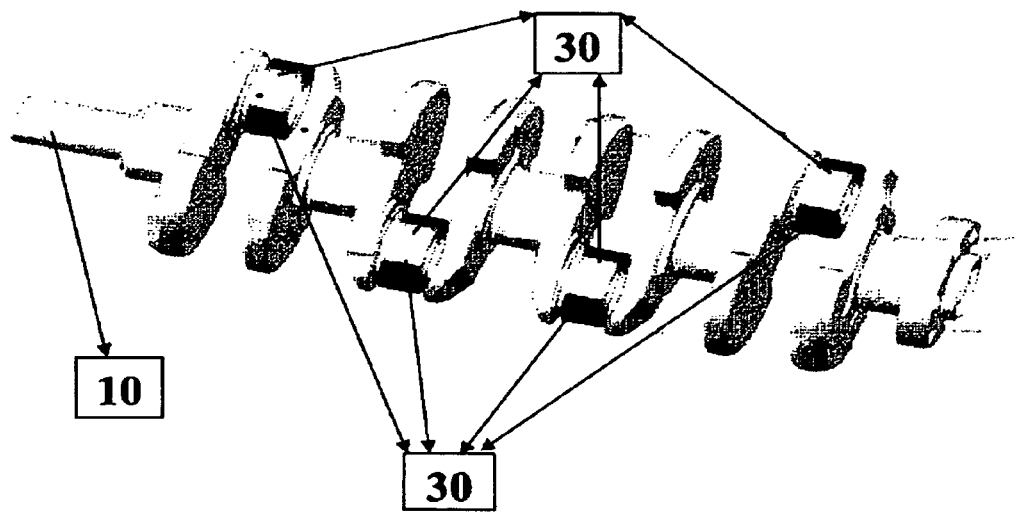
FIG. 7: Displays the arrangement of moving bearings 30 on C2 surfaces of crankshaft 10
Figure 8:
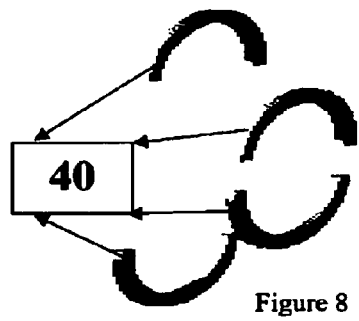
FIG. 8: Displays side bearings 40
Figure 9:
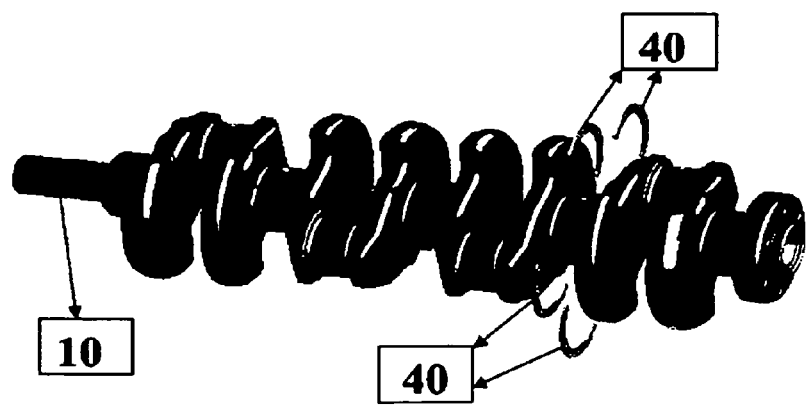
FIG. 9: Displays the arrangement of side bearings 40 on the crankshaft 10
Figure 10:
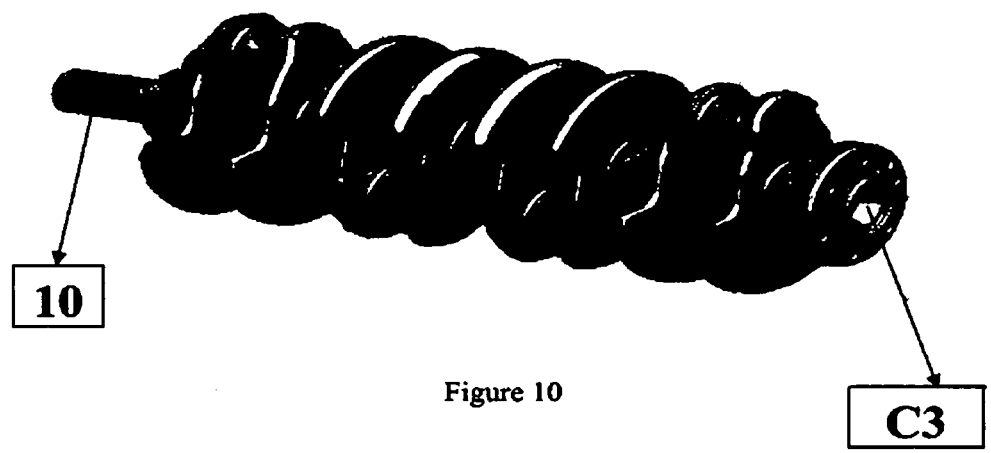
FIG. 10: Displays aperture C3 at one end of crankshaft 10 which is the location of gearbox shaft 50
Figure 11:
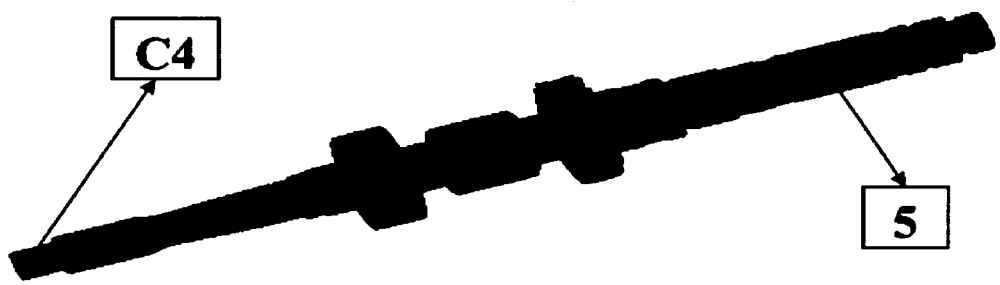
FIG. 11: Displays the lack of contact between crankshaft 10 and input gearbox shaft 50; because the length and diameter of C4 is smaller than aperture C3
Figure 12:
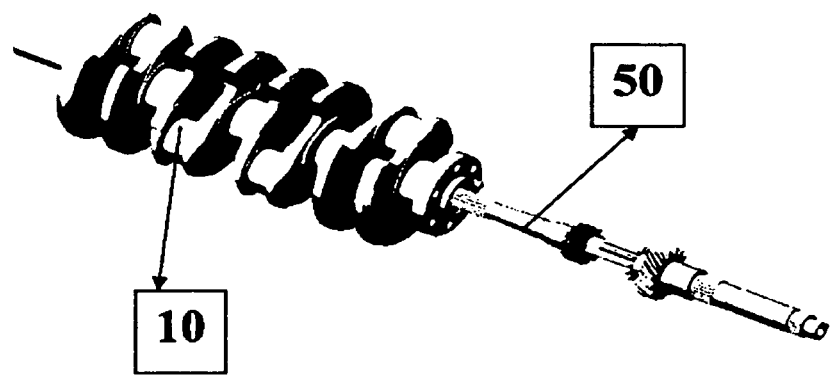
FIG. 12: Displays the position of C4 of gearbox shaft 50 in aperture C3 is at the end of crankshaft 10
Figure 13:
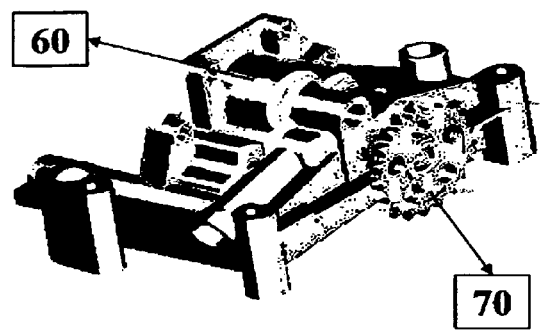
FIG. 13: Displays oil pump 60 and oil pump gear 70
Figure 14:
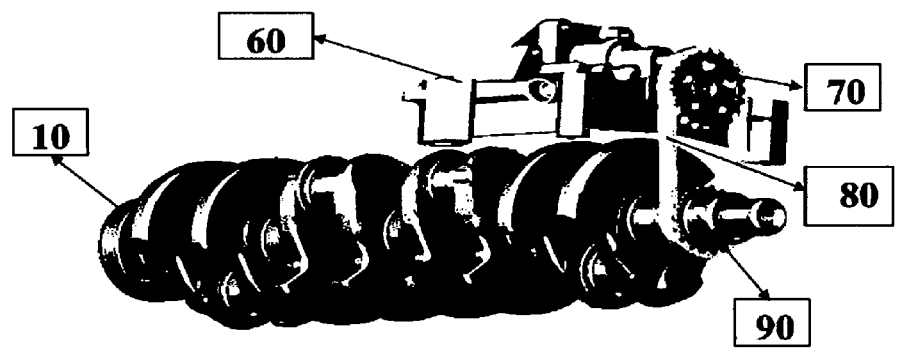
FIG. 14: Displays the oil pump gear 70 which takes its movement from chain 80 and gear 90 takes it from crankshaft 10
Figures 15, 16:
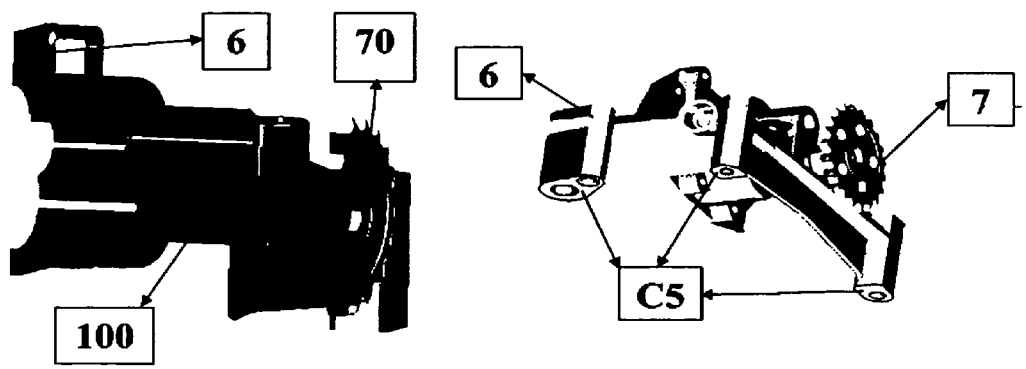
FIG. 15: Displays oil pump shaft 100 which is isolated from oil pump 60 by a layer of oil
FIG. 16: Displays surfaces C5 which are the location of oil pump 60 on cylinder block 110
Figure 17:
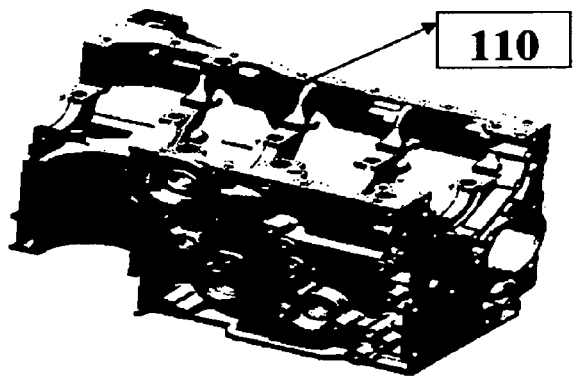
FIG. 17: Displays cylinder block 110
Figure 18:
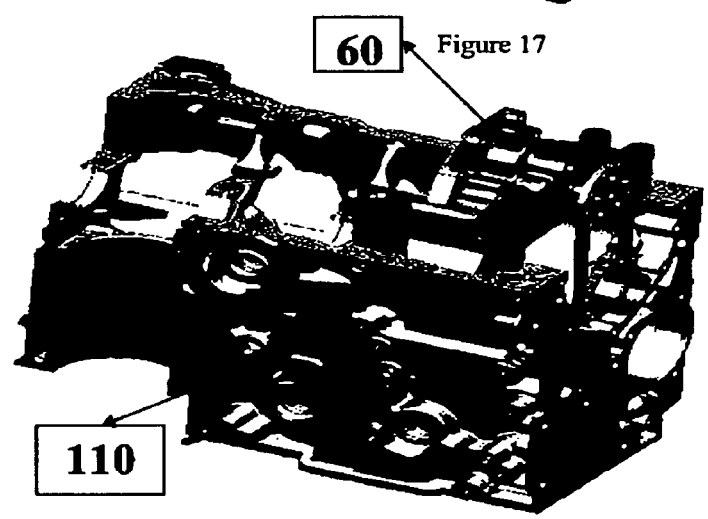
FIG. 18: Displays oil pump 60 which is located on cylinder block 110
Figure 19:
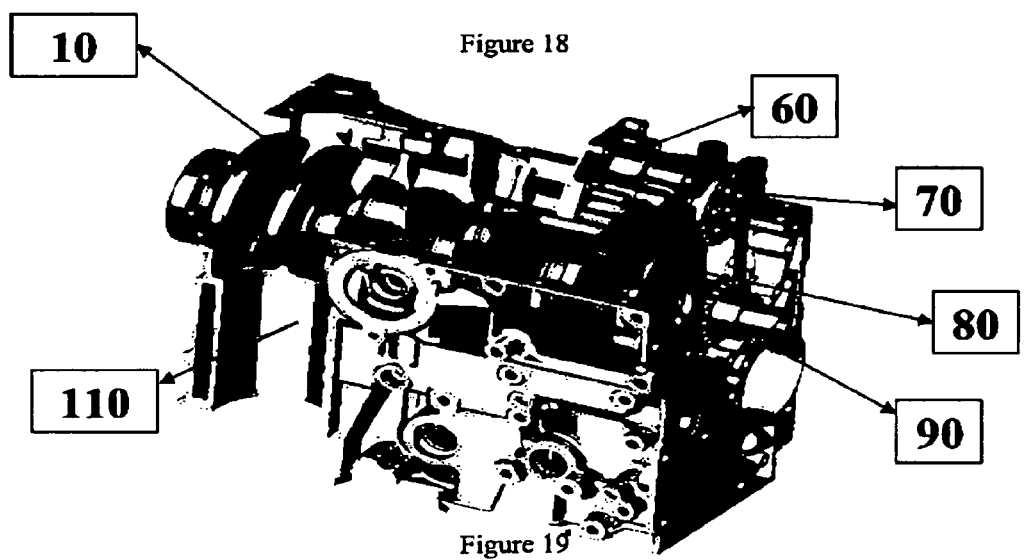
FIG. 19: Displays connection between gears 70 and 90 which is through chain 80 and also location of oil pump 60 and crankshaft 10 on cylinder block 110 are shown.
Figure 20:
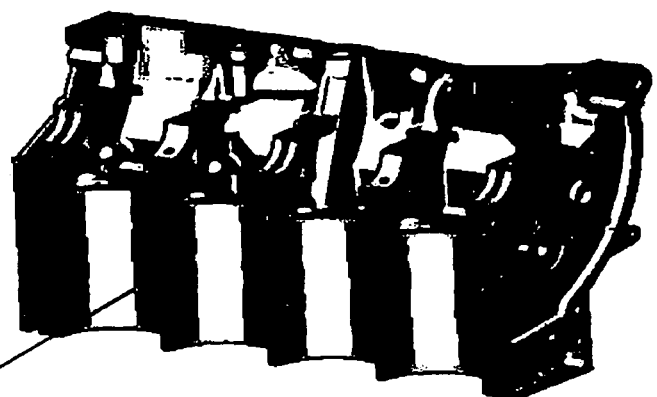
FIG. 20: Displays a cross section of cylinder block 110
Figure 21:
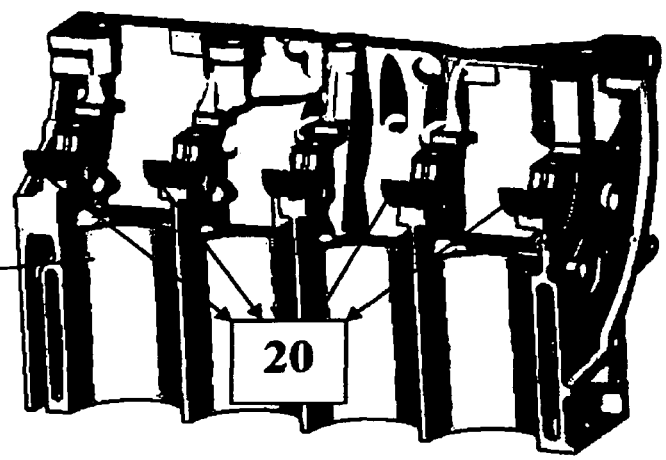
FIG. 21: Displays a cross section of cylinder block 110 with mounted fixed bearings 20
Figure 22:
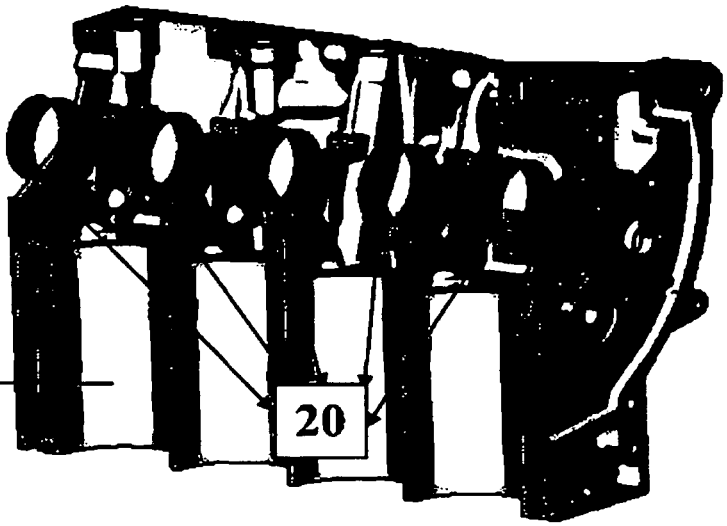
FIG. 22: Displays a cross section of cylinder block 110 with mounted fixed bearings 20
Figure 23:
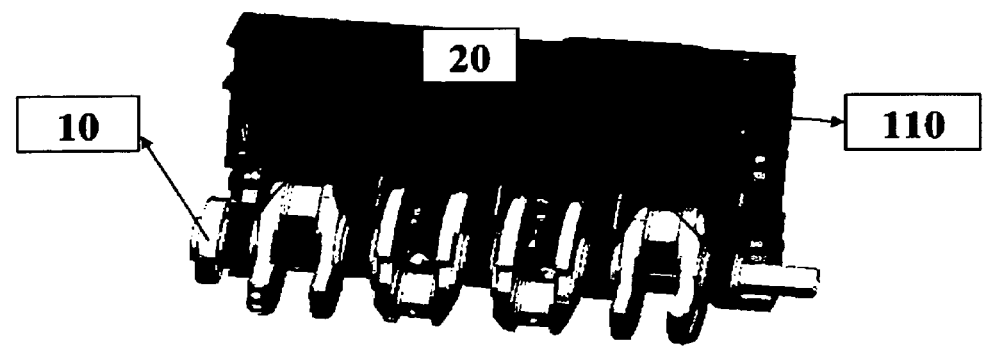
FIG. 23: Displays a cross section of cylinder block 110 with crank shaft 10 and fixed bearings 20 attached to it.
Figure 24:
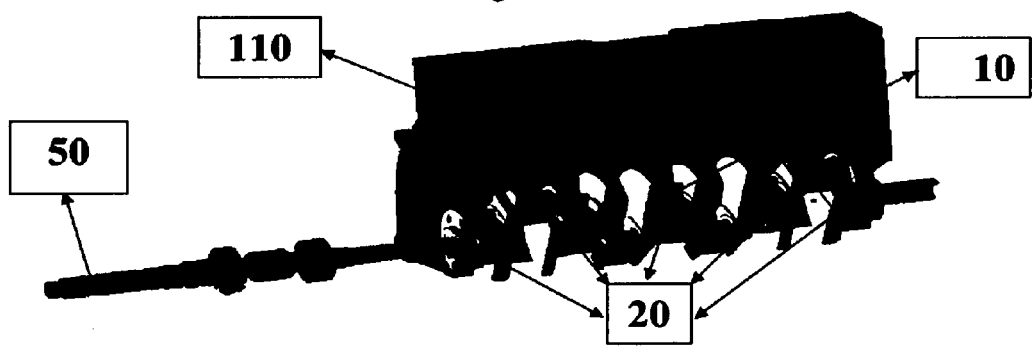
FIG. 24: Displays a cross section of cylinder block 110 with crank shaft 10, fixed bearings 20 and gear box shaft 50.
Figure 25:
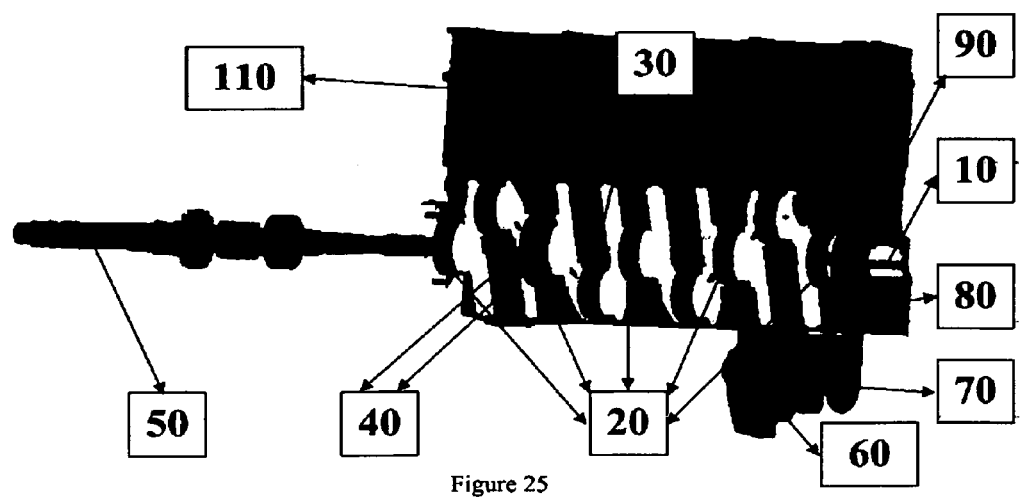
FIG. 25: Displays how crank shaft 10, fixed bearings 20, moving bearings 30, side bearings 40, gear box shaft 50, oil pump 60, gears 70, chain 80, gears 90 and cylinder block 110 are located in an engine.
Figure 26:
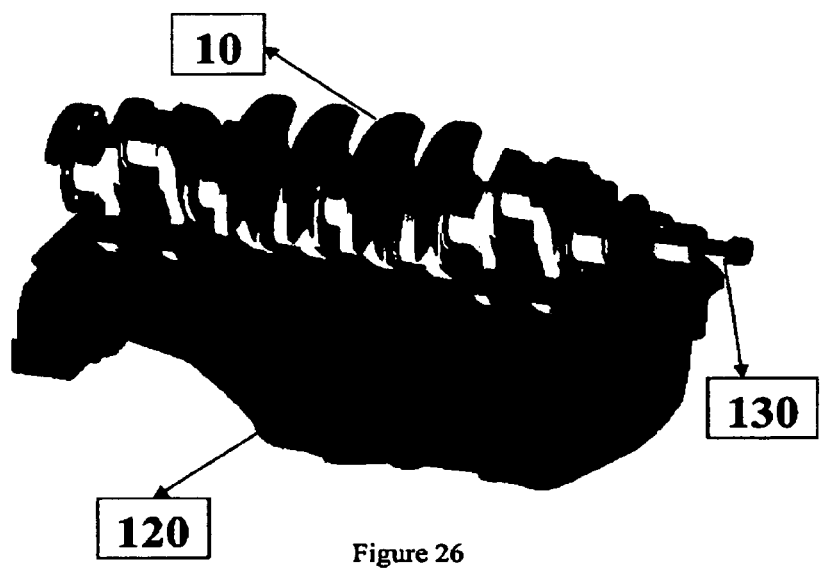
FIG. 26: Displays oil reservoir 120 located under cylinder block 110 is attached with screws on pulley 130.
Figure 27:
FIG. 27: Displays three wires (White wire D1, Black wire D2 and Red wire D3) connecting to the engine for crankshaft testing.
Figure 28:
FIG. 28: Displays the message "Contact of bearing with crankshaft".
Figure 29:
FIG. 29: Displays how wires D3 and D2 are connected to anode and cathode of a transportation device's battery
Figure 30:
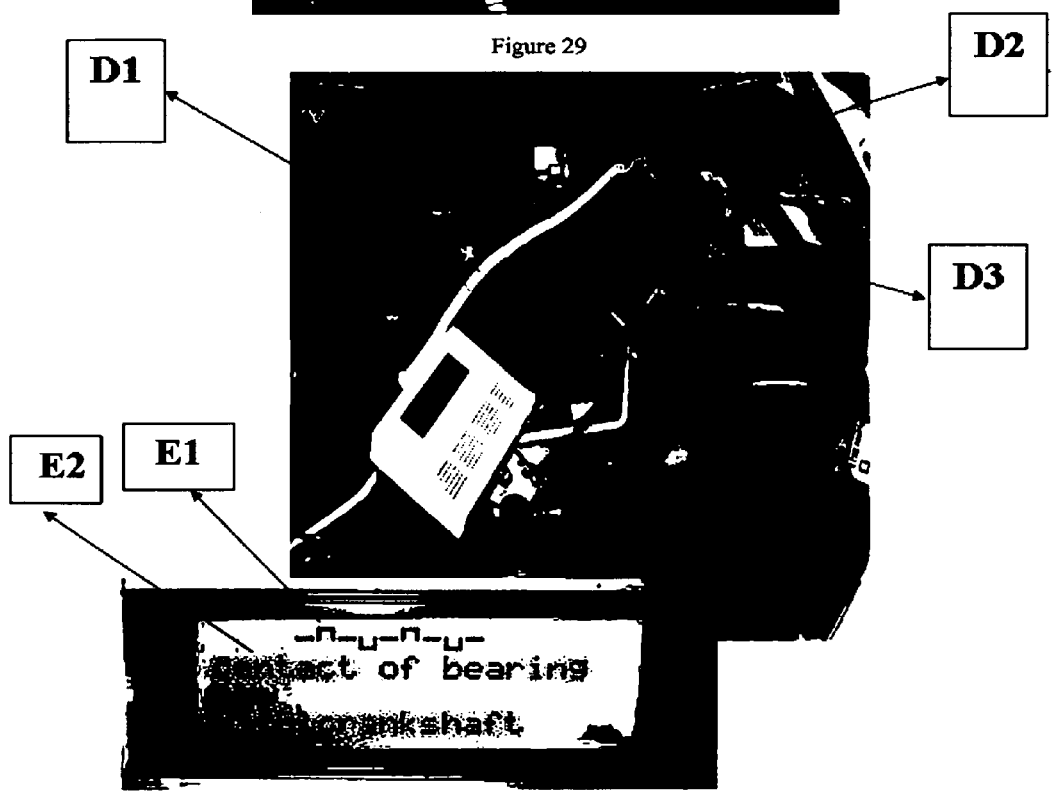
FIG. 30: Displays D3 connected to cathode and a schematic crankshaft symbol E1 and the message "Contact of bearing with crankshaft" pops up on an LCD D4 screen.

In this design we can warn the driver if any contact takes place between bearings (20, 30 and 40) and crankshaft 10 and display it on the screen due to moving oil under pressure. Besides, we can exactly identify defected bearing which contacts to the crankshaft. In case of any contact between bearings and crankshaft, driver is warned by an indicator.

This invention is based on two processes:
A: Warns the driver right after the first connection between crankshaft and one of bearings
B: In the second phase the target is to identify the direct point of connection which helps the repairman to find defected bearing and replace it.

First we Describe Part A:

The most important reasons causing contact between crankshaft and bearings are:
1—Oil Low viscosity
2—Extra pressure on bearing while driving with low gear at low speed.
3—Small metal pieces between bearing and crankshaft Normally we can classify the location of probable contact of crankshaft and either bearings or any other parts to the following groups:
1—Fixed bearings 20
2—Moving bearings 30
3—Side bearing parts 40
4—Aperture C3 at one end of crankshaft 10 which is the location of gearbox shaft 50
5—From oil pump 60 and its chain 80

When a petrol engine is off, the crankshaft 10 is located on lower bearings due to its weight. As soon as the engine turns on: the oil pump 60 sends the oil under bearings with proper pressure. The oil has a wedge move so crankshaft 10 moves from its place and there is no contact between crankshaft 10 and bearings (20, 30 and 40) and floats on a layer of oil. In this time if we connect the body of vehicle and the crankshaft with an ohmmeter, there is no connection but if we do the same when the engine is off, we have connection with low resistance.

If the connection between crankshaft 10 and cylinder block 110 is through the oil pump 60 we can isolate the oil pump 60 from the body by putting some dielectric spacers under C5 surfaces or we can insert a dielectric bushing in the middle of gears 70.

In the first phase the target is to add an electrical circuit (using the difference between electrical resistances when the engine is off and on) which can exactly identify the contact between crankshaft 10 and parts 20, 30, 40.

This device has 3 wires:
D3: Red wire to connect to anode of the car's battery.
D2: Black wire to connect to a cathode of the car's battery.
D1: White wire to connect to pulley 130 of crankshaft 10.

On the LCD screen D4 a schematic E1 of crankshaft 10 is displayed and also under this picture message of "Contact of bearing with crankshaft" is designed E2. As is shown in the figures we connect D3 and D2 to anode and cathode of the car's battery. If we connect D1 to the cathode the schematic E1 of crankshaft 10 and the message "Contact of bearing with crankshaft" E2 pops up on LCD screen D4. If we disconnect D1 from the cathode, E1 and E2 will disappear.

Figure 31:
FIG. 31: Displays how red and black wires are connected to anode and cathode and where a white wire is connected to pulley screw 130.
Figure 32:
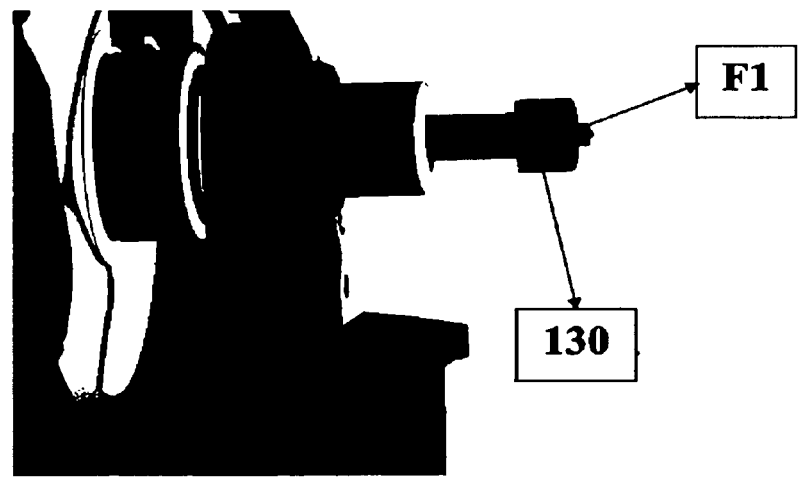
FIG. 32: Displays how red and black wires are connected to anode and cathode and where a white wire is connected to pulley screw 130.
Figure 33:
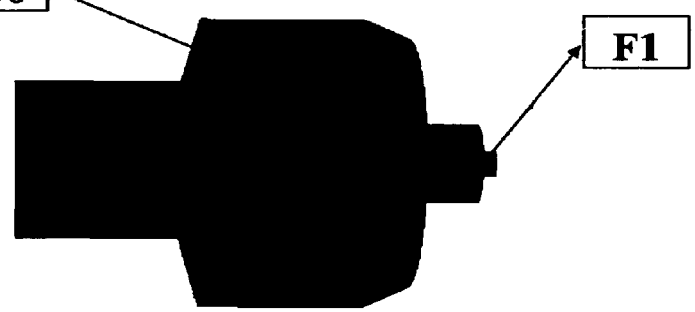
FIG. 33: In the center of pulley screw 130 a small part F1 is created to hold platinum eye F2 in place.
Figure 34:
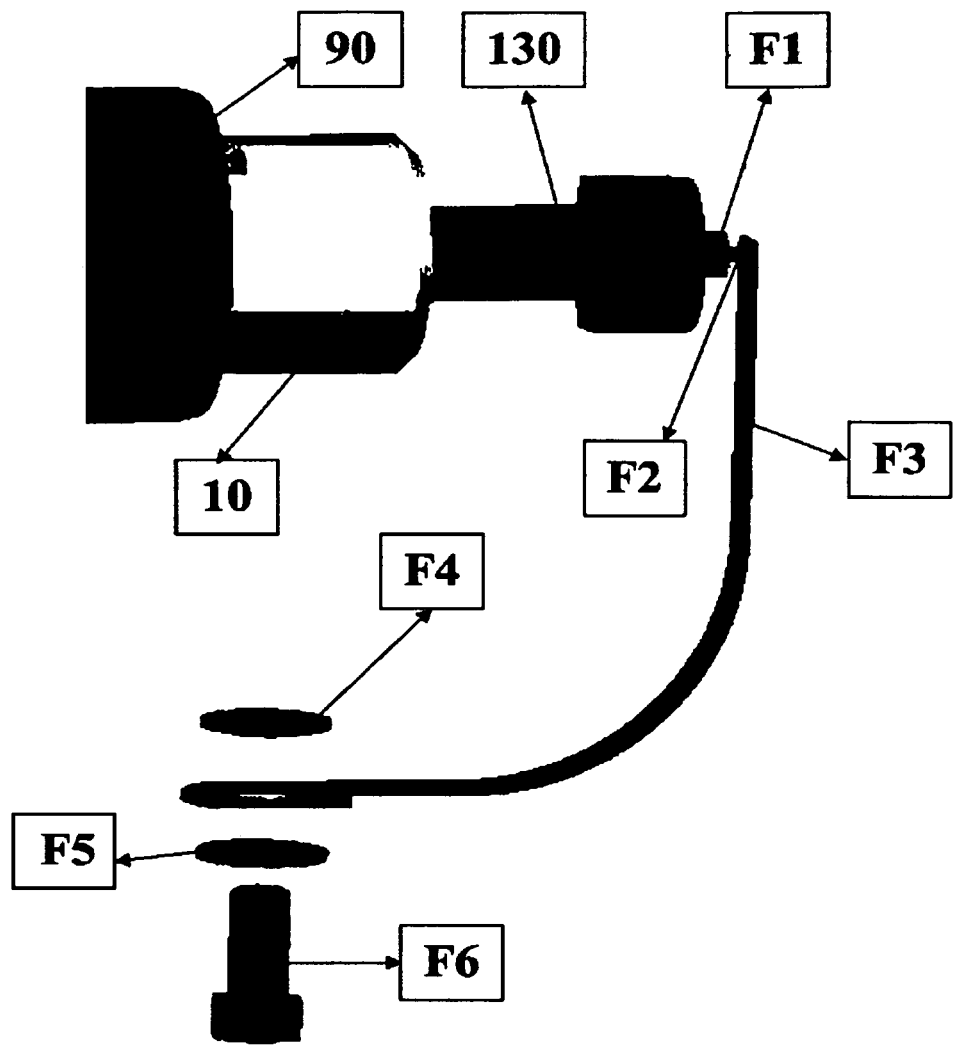
FIG. 34: Displays platinum eye F2 on F1, with a metal blade F3; including a dielectric edged spacer F4 and a simple dielectric spacer F5 and finally a screw F6.
Figure 35:
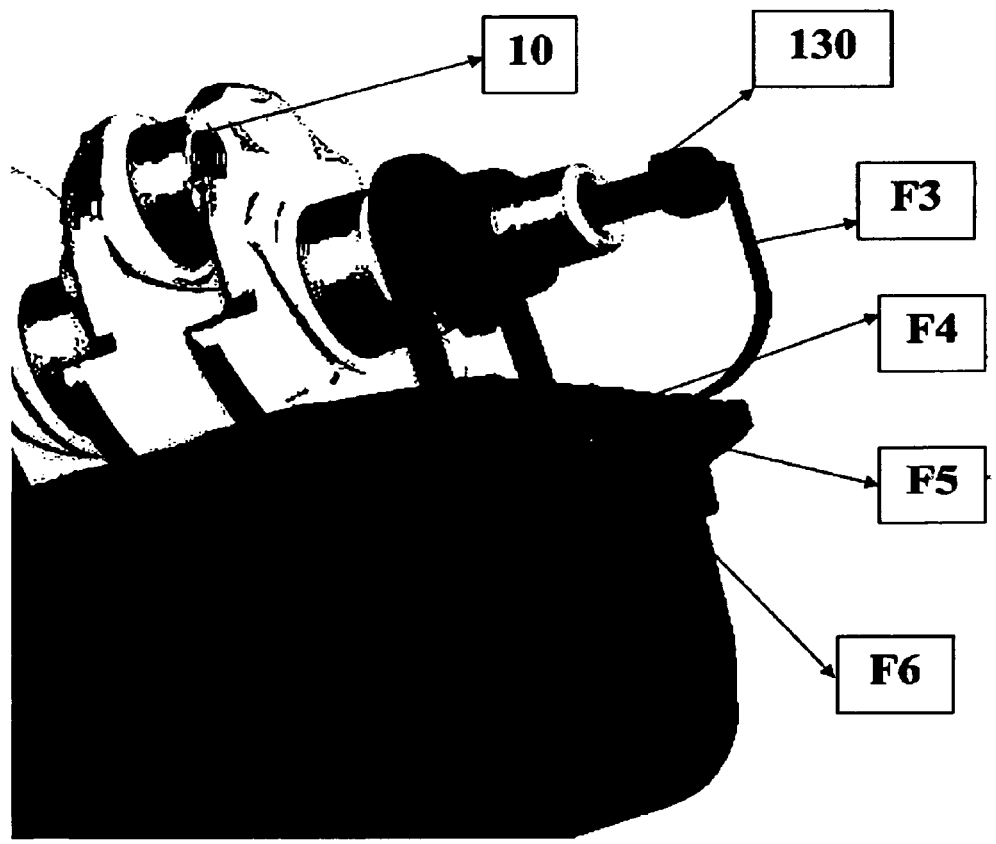
FIG. 35: Displays white wire D1 connected to platinum eye F2.
Figure 36:
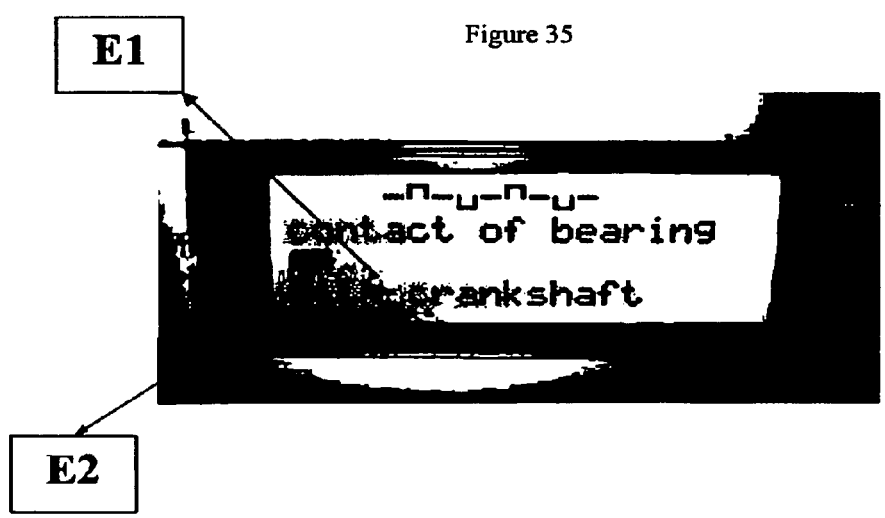
FIG. 36: Displays the LCD monitor D4 after white wire D1 is connected to platinum blade F2, showing E1 and E2.
Figure 37:
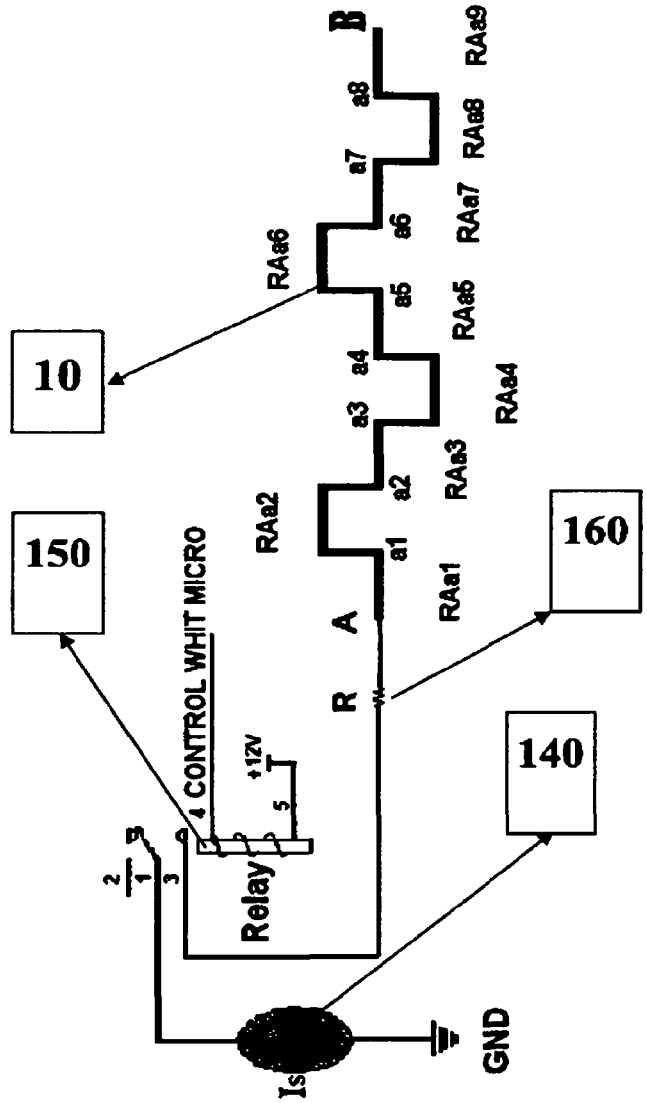
FIG. 37: Displays a schematic design of crankshaft 10 and its electrical circuits
Figure 38:
FIG. 38: Displays point A to a1 is related to the first fixed bearing 20 from crankshaft 10.
Figure 39:
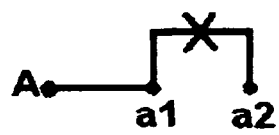
FIG. 39: Displays point a1 to a2 is related to the first moving bearing 30 from crank shaft 10.
Figure 40:
FIG. 40: Displays point a2 to a3 is related to the second fixed bearing 20 from crank shaft 10.
Figure 41:
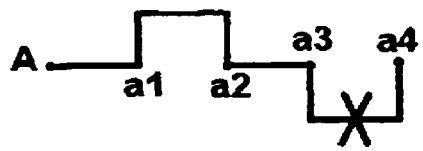
FIG. 41: Displays point a3 to a4 is related to the second moving bearing 30 from crank shaft 10.
Figure 42:
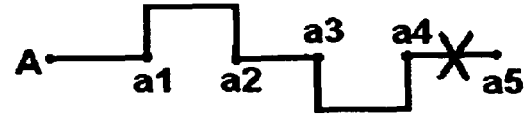
FIG. 42: Displays point a4 to a5 is related to the third fixed bearing 20 from crank shaft 10.
Figure 43:
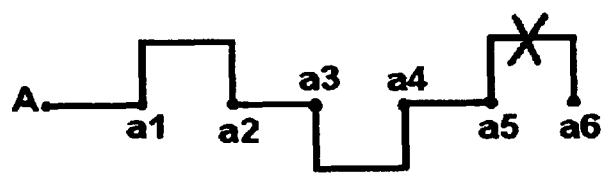
FIG. 43: Displays point a5 to a6 is related to the third moving bearing 30 from crank shaft 10.
Figure 44:
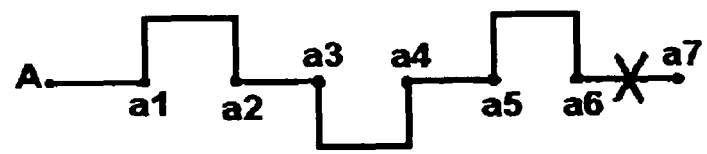
FIG. 44: Displays point a6 to a7 is related to the forth fixed bearing 20 from crank shaft 10.
Figure 45:
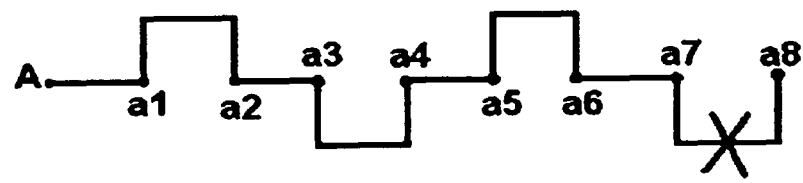
FIG. 45: Displays point a7 to a8 is related to the forth moving bearing 30 from crank shaft 10.
Figure 46:
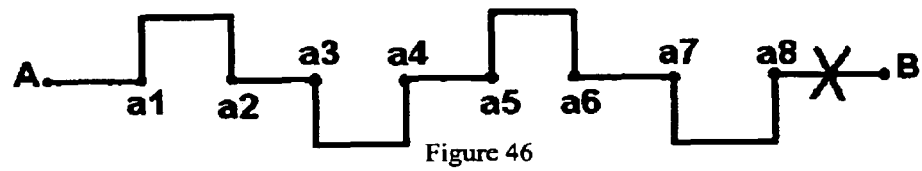
FIG. 46: Displays point a8 to B is related to the fifth fixed bearing 20 from crank shaft 10.

In order to check this on an engine of a car (or any transportation means) with an intact crankshaft; red and black wires are connected to anode and cathode of a car's battery and the white wire is connected to the pulley screw 130 (FIG. 31). This is accomplished using a platinum blade/eye F2 as described later. In the center of pulley screw 130 we create a small part F1 to hold the platinum blade F2 as shown in FIG. 32. On the F1 we put a platinum eye F2 with a metal blade F3 including a dielectric edged spacer F4 and a simple dielectric spacer F5 and finally a screw F6 (FIG. 34).

Metal blade F3 is tightened to an oil reservoir by screw F6, spacers F4 and F5 so it is completely isolated from cylinder block 110. Then white wire D1 is connected to platinum blade F2. If the engine is off, connection between cathode and blade F2 is through crankshaft 10, fixed and moving bearings 20, 30 and block cylinder 110. In this case we can see E1 and E2 displayed on the LCD screen D4. However if we start the engine we can't see schematic E1 of crankshaft 10 and E2 "contact of bearing and crankshaft" because a film of oil covers crankshaft and the connection between crankshaft 10 and bearings (fixed 20 and moving 30) and also side bearings 40 will be lost.

If for any reason there is a contact of crankshaft 10 with fixed bearings 20 and moving bearings 30 or side bearing 40, we will have E1 and E2 on LCD D4. We can use this as a warning indicator for vehicles or any other equipped device with bearings.

Explanation about Part B:

In second phase the target is to make a device that identifies the contact point exactly on crankshaft 10. This device helps the technician to find the contact point of defect (which bearing connected to crankshaft 10). For this reason we can use ohmic quantities. Suppose a circuit with 3 wires (D1, D2 and D3); two wires for connecting to the battery and the third one for connecting to crankshaft 10.

The procedure is after the engine is turned on, the board's energy is supplied by battery. When we push the start button after T second a current (milliamp) passes through crankshaft 10; from crankshaft pulley center screw 130 by metal blade F3. At the same time voltage drop is read by an ADC port (not shown). If there is any contact between crankshaft 10 and body, the ohmic resistance and also exact location is shown on LCD D4.

To do this, the ohmic quantities for different points of crankshaft are pre-defined and saved in the device. So when the Ohm is measured it is easily compared with default values and the exact point of contact is found.

Conductors have electrical resistance which is related to their electrical length based on the following equation:

$$R = \rho \times \frac{L}{S} \quad (1)$$

After turning on the engine, the board will be supplied with positive voltage from positive pole of the Battery. At the same time with starting the engine (start board) after T seconds a little amount of electrical current (mA) is passed from crankshaft 10 (from the screw center of crankshaft pulley 130) and meanwhile the voltage drop is read from ADC micro port (not shown).

If there's a contact between crankshaft 10 and body (bearings), the ohmic amount is shown on the LCD screen D4 and also the exact point of contact is identified. For this reason the ohmic amount from different points of crankshaft 10 had already been measured and saved in the micro memory. When the ohm is measured, the numbers are compared with the saved ones and the exact point of contact is defined.

Schematic design of crankshaft 10 and means for measuring the point of contact

140: Current resource
150: Relay
160: Protector resistance
10: Crankshaft

The crankshaft resistance is shown in the figures based on the length in different parts. Crankshaft 10 is divided into multiple sections to represent resistance of each one of fixed and moving bearings from point A to point B. These sections are named as follows: RAa1, RAa2, RAa3, RAa4, RAa5, RAa6, RAa7, RAa8, RAB.

Point A to a1 is related to the first fixed bearing 20 of crankshaft from 10, whereas point a1 to a2 is related to the first moving bearing 30. Therefore point a2 to a3 is related to the second fixed bearing 20 and point a3 to a4 is related to the second moving bearing 30 of crankshaft 10. Point a4 to a5 is related to the third fixed bearing 20 and point a5 to a6 is related to the third moving bearing 30; whereas point a6 to a7 is related to the forth fixed bearing 20 and point a7 to a8 is related to the forth moving bearing 30 of crankshaft 10. Same goes for point a8 to B is related to the fifth fixed bearing 20.

Any contact between crankshaft 10 and bearing in a1 would pass through RAa1 and appears as a voltage based on the following equation:

$$VAa1 = is(RAa1+R) \quad (2)$$

Change in voltage from point A to a1 is due to resistance increment which is calculated by:

$$RAa1 = \rho \frac{Aa1(m)}{S} \quad (3)$$

This change is distinguished by analogue to digital micro controller converter (ADC) and is shown on LCD screen D4. VAa1 is a defined value which is directly related to RAa1 and this is dependent on the distance between a1 to A.

Therefore for other points we have the same calculations:

$VAa2=IS*RAa2$ $VAa2+VR \Rightarrow ADC \Rightarrow$ Specified code
for the first moving bearing $VAa3=IS*RAa3$ $VAa3+VR \Rightarrow ADC \Rightarrow$ Specified code
for the second fixed bearing $VAa4=IS*RAa4$ $VAa4+VR \Rightarrow ADC \Rightarrow$ Specified code
for the second moving bearing $VAa5=IS*RAa5$ $VAa5+VR \Rightarrow ADC \Rightarrow$ Specified code
for the third fixed bearing $VAa6=IS*RAa6$ $VAa6+VR \Rightarrow ADC \Rightarrow$ Specified code
for the third moving bearing $VAa7=IS*RAa7$ $VAa7+VR \Rightarrow ADC \Rightarrow$ Specified code
for the fourth fixed bearing $VAa8=IS*RAa8$ $VAa8+VR \Rightarrow ADC \Rightarrow$ Specified code
for the fourth moving bearing $VAB=IS*RAB$ $VAB+VR \Rightarrow ADC \Rightarrow$ Specified code
for the fifth fixed bearing Now the following relations and voltages are defined for different points of crankshaft 10:
RAa1 is proportional with the distance between A to a1; and VAa1 is the voltage of this point.
RAa2 is proportional with the distance between A to a2; and VAa2 is the voltage of this point.
RAa3 is proportional with the distance between A to a3; and VAa3 is the voltage of this point.
RAa4 is proportional with the distance between A to a4; and VAa4 is the voltage of this point.
RAa5 is proportional with the distance between A to a5; and VAa5 is the voltage of this point.
RAa6 is proportional with the distance between A to a6; and VAa6 is the voltage of this point
RAa7 is proportional with the distance between A to a7; and VAa7 is the voltage of this point
RAa8 is proportional with the distance between A to a8; and VAa8 is the voltage of this point
RAB is proportional with the distance between A to B; and VAB is the voltage of this point The points are defined based on their resistance. So we can specify the points in this order. The purpose is to display and codify the distances in different names which from the front of the engine are categorized as: Fixed crank one; Moving crank one; Fixed crank between one and two; Moving crank two; Fixed crank between two and three; Fixed crank three; Fixed crank between three and four; Moving crank four; Fixed crank between four and flywheel (fixed five).

So we can show the contact points between crankshaft 10 and body by micro controller in both displaying and writing method on LCD screen D4. There is a possibility to sound and alarm or display flashing or solid light warnings to vehicle driver, diesel engine operator, ship engine operator, plane or any other device with crankshaft.

It is understood that the above description and drawings are illustrative of the present invention and that changes may be made in materials, method steps without departing from the scope of the present invention as defined in the following claims.

The invention claimed is:
1. An instant crankshaft control device comprising a crankshaft; multiple fixed bearings, multiple moving bear- ings and multiple side bearings; wherein said crankshaft comprises multiple fixed bearing surfaces, multiple moving bearing surfaces and multiple side bearing surfaces accommodating each one of said multiple fixed bearings, moving bearings and side bearings respectively; a white, black and red wire connected to a moving/transportation device that uses said crankshaft, a monitoring unit; wherein said red and black wires are connected to cathode and anode of a battery of said moving/transportation device from one end and wherein said red and black wires are connected to said monitoring unit from another end; wherein said white wire is connected to a center of a pulley screw of an engine of said moving/transportation device from one end and to said monitoring unit from another end; wherein said white wire is connected to said pulley screw via a platinum eye and/or blade; wherein said monitoring unit displays symbols/schematic and messages indicating functionality of said crankshaft and each on of aid multiple moving and fixed bearings, based on a comparison between a preprogrammed data and a measurement collected through said red, black and white wires, and wherein said monitoring unit will sound and display warning to an operator of said moving/transportation device based on said comparison.

2. The instant crankshaft control device of claim 1, wherein said monitoring unite displays distal and formal ends of said crankshaft as points A and B; and wherein said points are divided into multiple sections wherein starting from point A, sections with an odd number represents each one of said fixed bearings (a1, a3, a5, a7 and so forth) where a last one of said fixed bearings is represented by point B; and wherein all other sections between said fixed bearings are representing each one of said moving bearings (a2, a4, a6 and a8); wherein a voltage value and resistance of each one of said fixed and moving bearings of a fully said functional crankshaft has been premeasured and preprogrammed in said monitoring unit, where said monitoring unit during testing of said crankshaft measures said voltage values and said resistances of each one of said fixed and moving bearings and displays any discrepancies on a screen of said monitoring unit, indicating defected bearings contacting said crankshaft.

3. The instant crankshaft control device of claim 2, wherein said premeasured and preprogrammed voltage value is measured when an engine is off; and said voltage value is measured again by said monitoring unit when said engine is turned on; if any contact exists between any of said fixed or moving bearings and said crankshaft a voltage drop will be detected in comparison to said premeasured and preprogrammed voltage value due to an increase in a new value of said resistance created between each one of said surfaces of each one of said fixed and moving bearings and that of their respective bearings.

4. The instant crankshaft control device of claim 3, wherein said moving/transportation device comprises a vehicle, diesel fueled transportation device, a ship, and/or a plane.

5. The instant crankshaft control device of claim 4, wherein said warning is given when metal particles entered between said ball bearings and said crankshaft are detected.

6. The instant crankshaft control device of claim 4, wherein said warning is given when deteriorated oil loses its viscosity and therefore said crankshaft comes into contact with said ball bearings.

7. The instant crankshaft control device of claim 4, wherein said warning is given when said driver/operator is driving in high gears when engine's cycle is not high enough.

8. The instant crankshaft control device of claim 5; wherein said screen is an LCD display.

9. The instant crankshaft control device of claim 6; wherein said screen is an LCD display.

10. The instant crankshaft control device of claim 7; wherein said screen is an LCD display.

11. The instant crankshaft control device of claim 5; wherein said screen is a touch screen display.

12. The instant crankshaft control device of claim 6; wherein said screen is a touch screen display.

13. The instant crankshaft control device of claim 7; wherein said screen is a touch screen display.

14. The instant crankshaft control device of claim 8; wherein said monitoring unit is part of a display unit inside a cabin of said moving/transportation device.

15. The instant crankshaft control device of claim 9; wherein said monitoring unit is part of a display unit inside a cabin of said moving/transportation device.

16. The instant crankshaft control device of claim 10; wherein said monitoring unit is part of a display unit inside a cabin of said moving/transportation device.

* * * * *